United States Patent [19]

Gloth et al.

[11] 4,414,348

[45] Nov. 8, 1983

[54] STABILIZED POLYESTER COMPOSITIONS

[75] Inventors: Richard E. Gloth, Copley; James J. Tazuma, Stow; Max H. Keck, Cuyahoga Falls, all of Ohio

[73] Assignee: The Goodyear Tire & Rubber Company, Akron, Ohio

[21] Appl. No.: 460,980

[22] Filed: Jan. 26, 1983

[51] Int. Cl.³ .............................................. C08K 5/18
[52] U.S. Cl. .................................................... 524/255
[58] Field of Search ................ 524/255; 564/326, 327, 564/330, 433; 528/392, 422

[56] References Cited

U.S. PATENT DOCUMENTS

| | | | |
|---|---|---|---|
| 2,200,756 | 5/1940 | Messer et al. | 564/433 |
| 3,505,225 | 4/1970 | Wheeler | 252/47.5 |
| 3,533,992 | 10/1970 | Sundholm | 524/255 |
| 3,714,257 | 1/1973 | Bayha et al. | 564/409 |
| 3,714,258 | 1/1973 | Bayha et al. | 564/409 |
| 3,904,578 | 9/1975 | Kawase et al. | 524/334 |
| 3,987,004 | 10/1976 | Georgoudis | 524/108 |

FOREIGN PATENT DOCUMENTS 1768697 12/1971 Fed. Rep. of Germany .

OTHER PUBLICATIONS

A. Fritz et al., "Synthesis of Aryleneiso Propylidene Polymers"—J. Polymer Science, vol. 10, pp. 2365–2378 (1972).
Armianskii Khumicheskii Zhurnal 28(7), pp. 551–554 (1975).

Primary Examiner—Veronica P. Hoke
Attorney, Agent, or Firm—R. D. Thompson

[57] ABSTRACT

There is disclosed a method for stabilization of polyester resins by incorporating in the resins novel polymeric diphenylamine compounds, produced by reacting diphenylamine with a dialkylalkenylbenzene or a dihydroxyalkylbenzene in the presence of an acid catalyst.

10 Claims, No Drawings

STABILIZED POLYESTER COMPOSITIONS

BACKGROUND OF THE INVENTION

This invention relates to an improved stabilized polyester composition. It is particularly concerned with the use of a new class of polymeric products of the reaction of diphenylamine with a di-α-alkylalkenylbenzene or di-α-hydroxyalkylbenzene as stabilizers for saturated polyesters.

BACKGROUND ART

In moderate environmental conditions, polyesters are known to be relatively stable materials when compared to other types of polymers such as unsaturated rubbers containing dienes, polyurethanes, polystyrene. When polyesters are exposed to high temperatures and high humidity they tend to degrade with loss of physical and chemical resistance properties. It is desirable when such environmental conditions are present in a given type of application that the polyester be protected from degradation.

Various classes of compounds are known to have a stabilizing effect on polyesters. These classes include: phenolic compounds including phenols, bis-phenols, polyphenols; phosphites; amine-based materials including aromatic amines and aromatic polyamines. While the amine class of materials is recognized to have good stabilizing properties, the most common class of amine materials are the alkylated diphenylamine compounds which exhibit a strong tendency to discolor and possibly cause staining of adjacent surfaces when utilized in polyester. In addition, the alkylated diphenylamines have limited solubility in many polyesters. These deficiencies have limited the use of alkylated diphenylamines as polyester stabilizers. The known compounds and processes do not completely solve or mitigate the long-standing problem of producing high molecular weight polyester stabilized against deterioration and discoloration in high-temperature environments. Accordingly, we have carried out considerable research in this field to find a novel class of diphenylamine derivatives not disclosed or suggested by the prior art to be highly effective stabilizers for polyesters.

BRIEF DESCRIPTION OF THE INVENTION

An object of an aspect of this invention is to provide an improved high molecular weight, heat stable polyester and to a process for preparing such polyester. Another object of an aspect of this invention is to provide a polyester resin which has excellent resistance to thermal and hydrolytic degradation as well as excellent color stability. Specifically, the invention is directed to the use of a class of novel polymeric diphenylamine compounds as additives for high molecular weight polyesters and copolyesters which improve the thermal stability of the polyesters and demonstrated by stability in intrinsic viscosity and minimial increase in carboxyl number.

An aspect of this invention is a stabilized polyester composition comprising a polyester having incorporated therein a stabilizing amount of a polymeric diphenylamine compound of randomly distributed repeat units derived from diphenylamine and an additional component, said additional component comprising one or more compounds of structural formula (10)

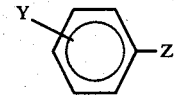
(10)

said polymeric compound containing one or more of structures V, VI and VII:

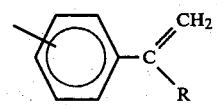
(V)

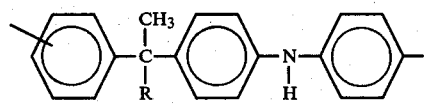
(VI)

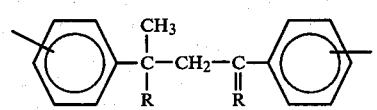
(VII)

wherein Y is para or meta relative to Z, Y and Z are the same or different radicals selected from the group consisting of

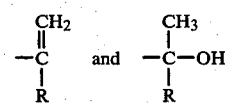

and R is an alkyl radical of from 1 to 8 carbon atoms.

Another aspect of this invention is a stabilized polyester composition comprising a polyester having incorporated therein a stabilizing amount of a polymeric diphenylamine compound prepared by contacting diphenylamine with an additional reactant in the presence of an acid catalyst, said additional reactant selected comprising one or more compounds of structural formula (1)

(1)

said polymeric compound containing one or more of structures V, VI and VII:

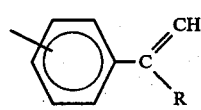
(V)

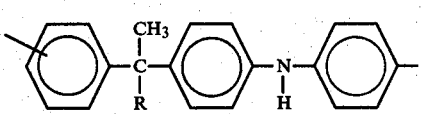
(VI)

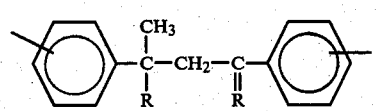
(VII)

wherein Y is para or meta relative to Z, Y and Z are the same or different radicals selected from the group consisting of

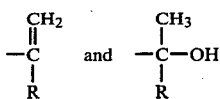

and R is an alkyl radical of from 1 to 8 carbon atoms.

MORE DETAILED DESCRIPTION

The term polyester encompasses polyesters and co-polyesters having linear chain-like structures derived: by reacting dicarboxylic acids or their derivatives with dihydric alcohols; or by heating omega hydroxydicarboxylic acids; or by reacting dicarboxylic or polycarboxylic acids with diols or polyols. Said polyesters or copolyesters may contain alkyl, cycloalkyl or other groups. The most common commercial polymerization technique for producing polyesters and copolyesters is an esterification or ester exchange step followed by a polycondensation reaction. During polycondensation the reactants are subjected to prolonged exposure at high temperatures which can produce finished high molecular weight resin having undesirable yellow or brown coloration. Subsequent to the production of the commercial resin, exposure to elevated temperatures typically occurs during the conversion of the resin to a useful end product such as textile yarns, tire cord, films, or packaging articles. Undesirable yellow or brown color may develop during the processing and fabrication steps where the polyester resin is in a molten state. This coloration carries through to the finished article and is generally undesirable in most commercial polyester applications. It is desirable to protect such high molecular weight polyesters and copolyesters from the degrading effects of high temperature and high humidity where the physical properties of the polyester may be affected and the aesthetic qualities of the polyester may be adversely affected by color development.

It has been discovered that an improved heat- and color-stable polyester resin, referred to hereinafter as a stabilized polyester composition, is obtained by incorporating into the polyester a polymeric reaction product of diphenylamine and a second reactant, said second reactant selected from the group of compounds of structural formula (1), set forth above. The preferred additional reactants are compounds having the chemical structure of I, II, III and IV:

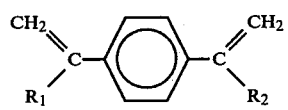

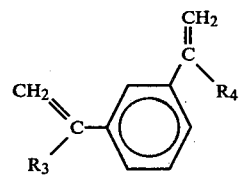

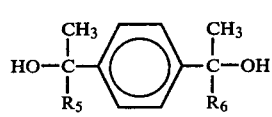

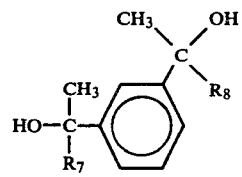

wherein $R_1$, $R_2$, $R_3$, $R_4$, $R_5$, $R_6$, $R_7$, and $R_8$ are the same or different radicals selected from the group consisting of alkyl groups of from 1 to 8 carbon atoms. Compounds of structures III and IV readily undergo a dehydration reaction to form the diolefins of corresponding structures I and II.

Illustrative compounds of Structure I are 1,4-diisopropenylbenzene, 1,4-di-α-ethylvinylbenzene, 1-isopropenyl-4-α-ethylvinylbenzene, 1-α-ethylvinyl-4-α'-isopropylvinylbenzene, and 1,4-di-α-isopropylvinylbenzene.

Illustrative compounds of Structure II are 1,3-diisopropenylbenzene, 1,3-di-α-ethylvinylbenzene, 1-isopropenyl-3-α-ethylvinylbenzene, 1-α-ethylvinyl-3-α'-isopropylvinylbenzene, and 1,3-di-α-isopropylvinylbenzene.

Illustrative compounds of Structure III are b 1,4-di-(α-hydroxyisopropyl)benzene, 1,4-di-(α-hydroxy-sec-butyl)benzene, 1-(α-hydroxyisopropyl)-4-(α-hydroxy-sec-butyl)benzene, 1,4-di-(α-hydroxy)-sec-amylbenzene, and 1-(α-hydroxyisopropyl)-4-(α-hydroxy-sec-amyl)benzene.

Illustrative compounds of Structure IV are 1,3-di-(α-hydroxyisopropyl)benzene, 1,3-di-(α-hydroxy-sec-butyl)benzene, 1-(α-hydroxyisopropyl)-3-(α-hydroxy-sec-butyl)benzene, 1,3-di-(α-hydroxy)-sec-amylbenzene, and 1-(α-hydroxyisopropyl)-3-(α-hydroxy-sec-amyl)benzene.

Preferred reactants are those having a methyl group in the position noted by $R_1$ through $R_8$ herein above, namely, 1,3 or 1,4-diisopropenylbenzene; and 1,3 or 1,4-di-(α-hydroxyisopropyl)benzene. Most preferred are the 1,4-diisopropenylbenzene and 1,4-di-(α-hydroxyisopropyl)benzene. The compounds of Structures I and II will be sometimes referred to in subsequent discussion of the reaction as a diolefin or as the diolefinic alkylating agent and compounds of Structures III and IV will be referred to as a dialcohol or as the dialcoholic alkylating agent.

The term polymeric compound means large molecules composed of more than one occurrence of at least one of the beginning reactants. The terms polymeric diphenylamine compound or polymeric diphenylamine stabilizers may be used interchangeably with polymeric compound. The simple compounds formed by the reaction of a single diphenylamine molecule with a single molecule of the second reactant of structures I, II, III and IV are specifically excluded from the term polymer or polymeric compound as used herein. A practitioner will recognize that the initial structure of the reactant will be altered during linkage to the adjacent unit in the larger molecule. The term repeat unit means a structure that occurs more than once in the polymeric compound and which differs from the structure of the initial reactant due to changes resulting from molecular reorientation during the linking to the adjacent structure. The changes may include, but are not limited to, addition to a double bond or the addition or removal of a hydrogen atom from the initial reactant.

Catalysts useful in the production of stabilizers for this invention are the Bronsted acid and Lewis acid type catalysts known to be useful in alkylation reactions. Such known catalysts include protonic acids such as $H_2SO_4$, HCl, $H_3PO_4$, $HClO_4$; metal halides such as $BF_3$, $BCl_3$, $AlCl_3$, $AlBr_3$, $SnCl_4$, $ZnCl_2$, $SbCl_3$ and their etherates; acidic clay and acid-activated clays. The choice of a particular catalyst is dependent upon many factors including the melting or boiling points of the reactants, desired rate of reaction, solvent, and pressure and temperature limitations of the production equipment, etc. The acidic clay catalysts offer the advantage of easy separation after the reaction is complete. Materials representative of this class of catalyst include the Filtrol (Filtrol Corporation) and Girdler K-series clays (Chemetron Corporation) or silica-alumina catalysts such as Durabead I (Mobil Oil Corporation). The Filtrols are acid-activated crystalline clays composed essentially of silica and alumina. The acid numbers of the clays range from 1.2 to 16. Super Filtrol Grade 1 has an acid number of 8. The Girdler K-series catalysts are acid-activated clays produced from the mineral Montmorillonite, an aluminum hydrosilicate with ideal formula $Al_2O_3.4SiO_2.H_2O+XH_2O$. Their activity ranges from pH 2.1 to above 4. Durabead catalysts are non-zeolitic coprecipitated silica-aluminas of low crystallinity. When higher yields are desired, the metal halides or their etherates may be utilized.

The reactions can be carried out without solvent at or above the melting points of the reactants or can be carried out in a solvent. The solvent can be an aliphatic $C_6$ to $C_{12}$ hydrocarbon or an aromatic or haloaromatic ($C_6$ to $C_9$) hydrocarbon or a $C_6$ to $C_9$ aliphatic halohydrocarbon. Examples of solvents are hexane, heptane, benzene, toluene, xylene and chlorobenzene. The preferred solvents are toluene and xylene.

The molar ratio of diphenylamine to the dialcoholic or diolefinic alkylating agent may preferably range from 4:1 to 1:4. The most preferred ratios range from 2.67:1 to 0.67:1. The method of addition of reactants varies depending upon the type of product desired. A solution of diolefin at 25° can be added quickly or dropwise to a stirred, refluxing mixture of catalysts and diphenylamine solution. If dialcohol is used it can be added slowly in a boiling solution. The addition of the selected dialcoholic or diolefinic alkylating agent to hot diphenylamine solution maximizes alkylation of the diphenylamine and minimizes olefinic dimerization. If a higher melting, higher molecular weight product is desired, dimerization can be promoted by adding the diolefin solution all at once to the diphenylamine solution before heating begins.

The reactions can be conveniently run at atmospheric pressure, but may also be run at other pressures. Reaction temperature may range from 25° C. to 200° C. with the preferred range being 60° C. to 140° C.

Moieties which are present in the polymeric compounds of this invention may include one or more of the following structures (V), (VI), and (VII):

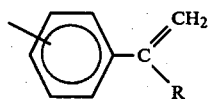 (V)

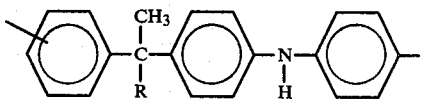 (VI)

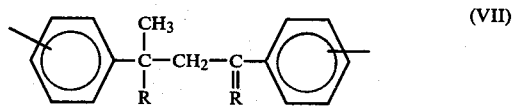 (VII)

where R is an alkyl group of from 1 to 8 carbon atoms. The substituent group of the nitrogen substituted aromatic rings is located predominately in the para position relative to the nitrogen. On non-nitrogen substituted aromatic rings, the alkyl groups may have either meta or para orientation to each other depending upon the molecular orientation of the initial reactants.

Nuclear magnetic resonance (NMR) analysis may be used to determine the presence of the structures V, VI and VII and thus partially characterize the polymeric product of a particular reaction condition. The relative percentage of each of the structures V, VI, VII present in the polymeric compound can be determined. The relative percentages are based on the quantity of structure V initially available for reaction. Where an initial reactant contains a hydroxyl end group it is assumed to dehydrate to the structure V prior to reaction to form VI and VII. The relative percentages of structures V, VI, VII may preferably have the following ranges: Structure V from 0 to about 25 percent; Structure VI from about 30 to nearly 100 percent; and Structure VII from about 1 to about 50 percent.

In addition to NMR characterization, molecular weight can be used to further describe the polymeric compounds of this invention. The molecular weights of the products as determined by gel permeation chromatography may range from about 425 to about 200,000.

Another embodiment of the invention is a process for the preparation of a stabilized polyester wherein the novel polymeric diphenylamine compounds described above may be added during the polymerization of the base polyester or copolyester resin. The stabilizers may be added to the initial charge of the reactants used for forming the polyester or copolyester or it may be added at any desired stage during the polyester polymerization process, preferably during the polycondensation reaction, and most preferably when the polyester has attained about half of the ultimate molecular weight of the desired finished polyester or copolyester. In an alternative embodiment, the novel polymeric diphenylamine stabilizers may be added to the high molecular weight polyester resin at any time prior to high temperature melt processing which is generally associated with the fabrication of the final form of the finished resin such as a film, fiber, monofilament, parison, container or article. The stabilizer may be added prior to or during the melting of the polyester resin in equipment commonly used for this purpose such as a melt extruder. An alternative method of incorporation is by solvating the polyester and intimately mixing the polymeric diphenylamine compound into the solution. The stabilizer should be uniformly distributed throughout the high molecular weight resin. In general, the stabilizer should be added at the earliest possible point in the exposure of the polyester resin to high temperature conditions which lead to degradation of the physical properties of the polyester and to the development of undesirable color in the finished polyester article.

The term, a stabilizing amount, refers to that quantity of polymeric diphenylamine compound which achieves the desired level of protection of the polyester resin. The amount of stabilizer used can be varied over a wide range of concentrations. Generally the amount used will be from about 0.01 to about 2.0 percent by weight of the polyester resin being stabilized. The preferred amount will be in the range from about 0.05 to about 1% by weight of the polyester resin to obtain optimum stability. While a polymeric diphenylamine stabilizer of this invention will normally be used as the sole stabilizing agent in the polyester resin, it can be used in conjunction with other known stabilizing agents and synergists.

The polyester compositions of this invention may contain other compounding ingredients as are required by the end use application and environment. These may include ultraviolet light stabilizers, fillers, nucleating agents, coloring agents, and brightners all of which are well known in the art. These various ingredients may be used as required by the end use application or environment.

PREFERRED EMBODIMENTS

The following examples illustrate the preparation of the polymeric diphenylamine stabilizers of the present invention and are intended to illustrate but not limit the practice of the present invention.

The structural compositions of the products prepared in the following examples were determined by NMR spectroscopy. The structural compositions reported represent the relative percentages of each of the following moieties (A), (B), and (C) based on the initial quantity of (A) available for reaction:

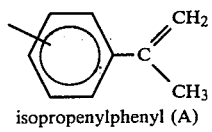

isopropenylphenyl (A)

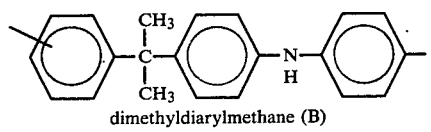

dimethyldiarylmethane (B)

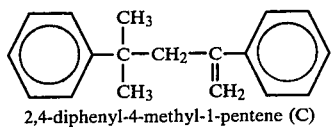

2,4-diphenyl-4-methyl-1-pentene (C)

Molecular weight distributions were determined by gel permeation chromatography (GPC) utilizing 100, 500, 1000, and 10,000 angstrom Micro Styrogel columns (Waters and Associates) and polystyrene standards from Pressure Chemical Company. Molecular weight distributions were calculated as polystyrene equivalents. Mn and Mw are the number and weight average molecular weights respectively, as derived from the GPC analysis. Melting points were determined by the capillary tube method in accordance with ASTM D-1519. All temperatures are °C. All softening points determined by ring and ball method, ASTM E-28.

STABILIZER SYNTHESIS EXAMPLES

Examples 1–4

The group of stabilizers shown in Table I were prepared by the following procedure: The appropriate number of moles of diphenylamine (DPA) and acidic clay catalyst, Super Filtrol Grade 1 (SF1) available through Filtrol Corporation were added to the solvent and the mixture was brought up to refluxing temperature (110° C. for toluene, 140° C. for xylene); any water present was azeotropically removed from the refluxing mixture. The level of catalyst used in all reactions was 15 weight percent based on the weight of diisopropenylbenzene. Once all water had been removed, the appropriate number of moles of 1,4-diisopropenylbenzene (DIB) dissolved in solvent were added by using one of two procedures. In the first, the DIB solution was added dropwise to the stirred refluxing mixture over the period of time designated in Table I, under column headed *DIB Addition*. In the second, the DIB solution was premixed with the DPA/SF1 solution prior to bringing the whole mixture to refluxing temperature. After the addition of the DIB by either procedure the mixture was maintained at reflux temperature (110° C. in toluene, 140° C. in xylene) for the number of hours shown in Table I under the column with heading *Reflux*.

The specific conditions used to produce each compound is set forth below in Table I.

TABLE I

| Example | DIB:DPA Molar Ratio | Solvent | DIB Addition | Reflux Hours |
|---|---|---|---|---|
| 1 | 2.67:1 | Toluene | 4 Hours | 1.0 |
| 2 | 2.67:1 | Toluene | Premixed | 5.0 |
| 3 | 1.5:1 | Toluene | Premixed | 5.0 |
| 4 | 1:1 | Toluene | Premixed | 5.0 |

The polymeric compounds resulting from the above described reactions are characterized below in Table II.

TABLE II

| Example | Color | Melting Point °C. | Molecular Weight | *Relative Mole Percent | | |
|---|---|---|---|---|---|---|
| | | | | A | B | C |
| 1 | Off-White | 67–74 | 1840–2000 | 21 | 51 | 28 |
| 2 | Off-White | 86–96 | 1850 | 14 | 60 | 26 |
| 3 | Off-White | 98–107 | 850–1880 | 10 | 72 | 18 |
| 4 | Off-White | 92–105 | 1850 | 0 | 92 | 8 |

*A, B, C refer to the NMR structures so designated which were previously described

Example 5

26.75 grams (0.158 mole) of diphenylamine was dissolved in 50 milliliters of toluene. 10.0 grams of Super Filtrol Grade 1 was added with stirring followed by a solution of 66.67 grams (0.42 mole) of p-diisopropenylbenzene (DIB) in 100 milliliters of toluene. The mixture was rapidly stirred and heated to reflux. After a 2.5 hour reflux period, 150 milliliters of toluene was added to the dark brown reaction mixture, which was filtered to give a cloudy pink solution. Evaporation of solvent yielded 88.2 grams of white resin, ring and ball softening point of 84°–93° C. The polymer's structural composition was 14% A, 51% B, and 35% C with molecular weight range of 485-3500.

Example 6

Example 5 was repeated in refluxing xylene. DIB solution was added to the refluxing diphenylamine-catalyst mixture over a 36 minute period. Stirring at reflux was then continued for 5 hours. 70 grams of pink resin was obtained having a ring and ball softening point of 74°-86° C. The polymer's structural composition was 23% A, 47% B, and 30% C.

Example 7

A solution of 37.8 grams (0.253 mole) diphenylamine in 75 milliliters of xylene was heated to reflux with 3.75 grams of Super Filtrol Grade 1. A solution of 25.0 grams of p-diisopropenylbenzene (0.157 mole) in 37.5 milliliters of xylene was added over a 40 minute period. Reflux was continued for 5 more hours with aliquots being taken at 1.5 and 3.0 hours. The products were white solids with the 1.5 hour sample melting at 133°-141° C. and the 3.0 hour sample at 136°-144° C. The 5 hour product melted at 166° to 169° C. and consisted of nearly 100% B with a molecular weight range of 900-3000. X-ray analysis revealed that this soluble alternating copolymer is crystalline.

Examples 8-10

Non-solvent, bulk reactions were carried out in the following manner: Diphenylamine (DPA) and the second reactant were premixed by melting both reactants and blending in the ratio desired for the reaction. The appropriate weight was placed into the reaction vessel and the head space then flushed with nitrogen gas. The reaction vessel was sealed and the reactants were preheated to 80° C. The appropriate amount of boron trifluorideetherate ($BF_3.OEt_2$) catalyst was then introduced into the reaction vessel and the vessel was maintained at 80° C. for three hours. Laboratory scale experiments utilized a glass vial as a reaction vessel with a self-sealing rubber lined cap through which the catalyst could be injected without the introduction of oxygen or moisture into the vessel. The reaction was terminated by injecting into the reaction vessel isopropyl alcohol, followed by triethanolamine. The solid product of the reaction was purified by solvating in methylene chloride and precipitating with methanol. The table below summarizes the reactions and molecular weights of the reaction products.

TABLE III

BULK POLYMERIZATIONS AT 80° C.

| Example | Second Reactant/DIB | Molar Charge Ratio, DPA:DIB | Catalyst Charge, Moles | Molecular Weight Mn | Molecular Weight Mw |
|---|---|---|---|---|---|
| 8 | 1,4-diisopropenylbenzene | 3.3:3.3 | 0.1 | 2100 | 4700 |
| 9 | 1,4-diisopropenylbenzene | 3.3:3.3 | 0.03 | 2900 | 6300 |
| 10 | 1,3-diisopropenylbenzene | 3.3:3.0 | 0.1 | 6800 | 137000 |

APPLICATION EXAMPLES

Examples 11-16

A dried polyethylene terephthalate base resin was used to evaluate the effectiveness of the stabilizers of this invention. The polyethylene terephthalate polymer was produced by methods well known in the art whereby terephthalic acid is esterified and then polycondensed with ethylene glycol to the desired high molecular weight product. For evaluation of these stabilizers the polyester based resin utilized had a 0.59 intrinsic viscosity (IV) as measured in a 60/40 by volume mixed solvent of phenol/tetrachloroethylene at 30° C. The base resin contained 20 parts per million by weight of triethylene diphosphate. The samples to be used for thermal oxidative stability testing were prepared in a reactor vessel equipped with heating jacket, vacuum system, and a means for stirring the molten contents of the reactor. The stabilized polyester compositions were produced by introducing into the reactor vessel 0.15 weight percent of the stabilizer to be evaluated along with the base polyester resin (0.59 IV). The reactor was purged with nitrogen and then put under a vacuum of 0.2 mm of Hg (0.27 mbar). The temperature was gradually raised to 280° C. Stirring was initiated as soon as the melt viscosity allowed the stirring apparatus to operate. The mixture was heated and stirred for 10 minutes. The vacuum was removed and the melt-blended composition was placed on a tray and cooled. The composition was then ground to a 20 mesh particle size. Intrinsic viscosity and carboxyl number were recorded at the outset and during the progress of the thermal oxidative test. Intrinsic viscosity was determined in a 60/40 phenol/tetrachloroethylene mixed solvent at 30° C. at a concentration of approximately 0.4 grams of polymer per 100 cubic centimeters of solution. Carboxyl number (equivalents of carboxyl per $10^6$ g of polyester) was determined by: dissolving 0.1 g PET in 5 ml of boiling benzylalcohol; quenching and diluting with 5 ml of chloroform; titrating with a 0.1 Normal solution of sodium hydroxide in benzylalcohol; calculating the equivalents of carboxyl in $10^6$ grams of PET. The initial IV and carboxyl numbers were determined and the ground test samples were placed in a circulating air oven at 240° C. for a period of five hours. The IV and carboxyl number were determined after five hours of exposure in the circulating air oven. The polymeric diphenylamine stabilizers which were evaluated by this method were synthesized according to the procedures set forth in Examples 1, 2, 3 and 4. Three controls were utilized. A 0.59 IV base polymer control (Example 11) was prepared without additional stabilizer added in the manner described above and a second control (Example 12) also of the unstabilized base polymer was produced as described above except that the vacuum was maintained for an additional 15 minutes. The additional time under vacuum brought the IV of the second control polymer up to 0.68. All pertinent data regarding the six test samples described above are contained in Table IV.

TABLE IV 0.59 IV PET with 0.15 Weight Percent Stabilizer

| Example | Stabilizer (wt %) | Color | Intrinsic Viscosity Initial | Intrinsic Viscosity 5 Hours | Carboxyl Number Initial | Carboxyl Number 5 Hours |
|---|---|---|---|---|---|---|
| 11 | Control (0.0) | White | .585 | .274 | 36 | 383 |
| 12 | Control (0.0) | White | .680 | .286 | 30 | 362 |
| 13 | Example 1 (0.15) | White | .642 | .808 | 34 | 43 |
| 14 | Example 1 (0.15) | White | .601 | .801 | 34 | 45 |
| 15 | Example 3 (0.15) | White | .604 | .817 | 35 | 40 |
| 16 | Example 4 (0.15) | White | .567 | .818 | 33 | 43 |

The data presented in Table IV above show several unexpected results from the addition of the novel polymeric diphenylamine stabilizers employed in this invention. Most surprisingly, the initial color of the polyester composition containing the polymeric diphenylamine antioxidants was observed to be opaque white which is characteristic of terephthalic acid based PET resin. The color in the melt state was a very slight desirable green tint. After 5 hours of aging in a severe oxidative environment at high temperature, the intrinsic viscosity of the polyester composition was observed to actually increase, indicating that a higher molecular weight polymer was being produced. The carboxyl number is also shown to be surprisingly stable in compositions containing the novel polymeric diphenylamine stabilizers. By contrast, the controls showed losses in intrinsic viscosity in excess of 55% and carboxyl numbers increased more than ten fold. This degree of polymer degradation is typical of unstabilized PET under the high temperature oxidative environment of this test.

INDUSTRIAL APPLICABILITY

The use of the novel polymeric diphenylamine stabilizers of this invention will fulfill a long felt need in the polyester industry for effective stabilizers that greatly lessen the deleterious effects of thermal degradation while maintaining excellent color stability. The stabilized polyester compositions of this invention can be useful in a wide variety of applications where good color stability and full retention of desirable initial physical properties must be maintained despite long term exposure to high temperature conditions in excess of 200° C. Such applications may include films, fibers and articles produced from stabilized polyesters including bottles, containers and trays.

While certain representative embodiments and details have been shown for the purpose of illustrating the invention it will be apparent to those skilled in this art that various changes and modifications may be made therein without departing from the scope of this invention.

We claim:

1. A stabilized polyester composition comprising a polyester having incorporated therein a stabilizing amount of a polymeric diphenylamine compound of randomly distributed repeat units derived from diphenylamine and an additional component, said additional component comprising one or more compounds of structural formula (10)

said polymeric compound containing one or more of structures V, VI and VII:

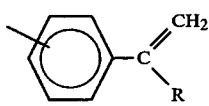

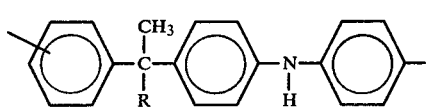

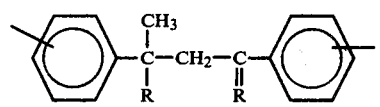

wherein Y is para or meta relative to Z, Y and Z are the same or different radicals selected from the group consisting of

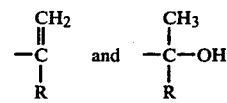

and R is an alkyl radical of from 1 to 8 carbon atoms, said polymeric diphenylamine compound having a molecular weight of about 425 to about 200,000.

2. A stabilized polyester composition according to claim 1 wherein said additional component is selected from the group of compounds having the following structural formulae (I), (II), (III) and (IV):

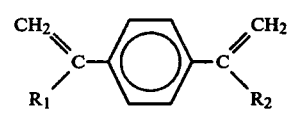

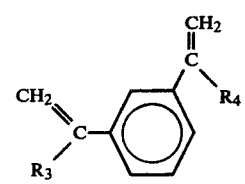

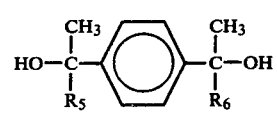

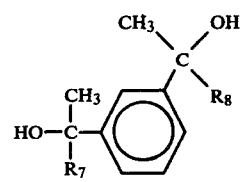

wherein $R_1$, $R_2$, $R_3$, $R_4$, $R_5$, $R_6$, $R_7$, and $R_8$ are the same or different radicals selected from the group consisting of alkyl groups of from 1 to 8 carbon atoms.

3. A stabilized polyester composition of claim 1 wherein said additional component is selected from the group of compounds consisting of 1,4-diisopropenylbenzene, 1,3-diisopropenylbenzene, 1,4-di-(α-hydroxyisopropyl)benzene and 1,3-di-(α-hydroxyisopropyl)benzene.

4. A stabilized polyester composition of claim 1 wherein the polymeric diphenylamine compound has a molecular weight ranging from about 450 to about 200000.

5. A stabilized polyester composition of claim 1 wherein 0.01 to 2.0 parts by weight of said polymeric diphenylamine compound is incorporated per 100 parts by weight of the polyester.

6. A process for making the stabilized polyester composition of claim 1 comprising adding said polymeric diphenylamine compound during the polymerization of said polyester.

7. A stabilized polyester composition comprising a polyester having incorporated therein a stabilizing amount of a polymeric diphenylamine compound prepared by contacting diphenylamine with an additional reactant in the presence of an acid catalyst, said additional reactant selected comprising one or more compounds of structural formula (10)

(10)

said polymeric compound containing structure VII and one or both of structures V and VI:

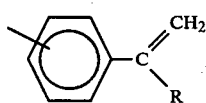
(V)

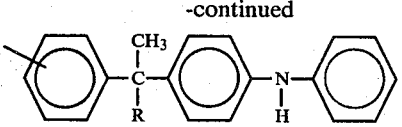
(VI)

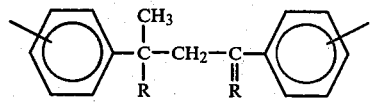
(VII)

wherein Y is para or meta relative to Z, Y and Z are the same or different radicals selected from the group consisting of

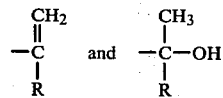

and R is an alkyl radical of from 1 to 8 carbon atoms, said polymeric diphenylamine compound having a molecular weight of about 425 to about 200,000.

8. A stabilized polyester composition of claim 7 wherein the molar ratio of diphenylamine to said additional reactant is within the range of 1:4 to 4:1.

9. A stabilized polyester composition of claim 7 wherein said contacting of the diphenylamine and the additional reactant in the presence of the acid catalyst takes place in a solvent.

10. A stabilized polyester composition of claim 9 wherein the acid catalyst is an acid activated clay.

* * * * *

UNITED STATES PATENT AND TRADEMARK OFFICE
CERTIFICATE OF CORRECTION

PATENT NO.   :   4,414,348
DATED        :   November 8, 1983
INVENTOR(S)  :   Richard E. Gloth et al.

It is certified that error appears in the above-identified patent and that said Letters Patent is hereby corrected as shown below:

Column 4, line 27, delete "b" before 1,4-di-

Column 14, lines 1 through 6, formula "(VI)" should appear as shown below instead of as in the patent:

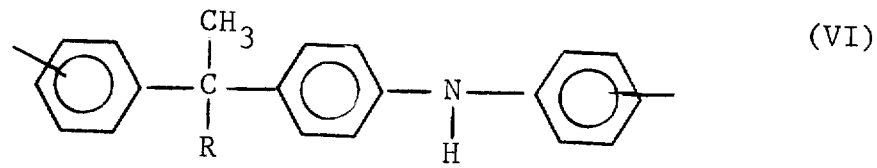

Signed and Sealed this

Twelfth Day of March 1985

[SEAL]

*Attest:*

DONALD J. QUIGG

*Attesting Officer*     *Acting Commissioner of Patents and Trademarks*